(12) United States Patent
Trainin et al.

(10) Patent No.: US 10,182,437 B2
(45) Date of Patent: *Jan. 15, 2019

(54) APPARATUS, SYSTEM AND METHOD OF INDICATING A TIME OFFSET USING A GRANT FRAME

(71) Applicant: INTEL IP CORPORATION, Santa Clara, CA (US)

(72) Inventors: Solomon B. Trainin, Haifa (IL); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,305

(22) Filed: May 23, 2017

(65) Prior Publication Data

US 2018/0014299 A1    Jan. 11, 2018

Related U.S. Application Data

(63) Continuation of application No. 14/749,665, filed on Jun. 25, 2015, now Pat. No. 9,693,349.

(60) Provisional application No. 62/119,200, filed on Feb. 22, 2015.

(51) Int. Cl.
*H04W 72/04* (2009.01)
*H04W 72/14* (2009.01)
*H04W 72/12* (2009.01)

(52) U.S. Cl.
CPC ....... *H04W 72/0446* (2013.01); *H04W 72/14* (2013.01); *H04W 72/1289* (2013.01)

(58) Field of Classification Search
None
See application file for complete search history.

(56) References Cited

U.S. PATENT DOCUMENTS

| 9,693,349 B2 | 6/2017 | Trainin et al. |
| 2011/0149798 A1* | 6/2011 | Cordeiro ............... H04W 8/005 370/254 |
| 2011/0310834 A1 | 12/2011 | Seek |

(Continued)

FOREIGN PATENT DOCUMENTS

| KR | 20110102847 | 9/2011 |
| WO | 2016089524 | 6/2016 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Eunsook Choi
(74) *Attorney, Agent, or Firm* — Shichrur & Co.

(57) ABSTRACT

Some demonstrative embodiments include apparatuses, devices, systems and methods of dynamic allocation using a grant frame. For example, a wireless station may be able to generate a grant frame including a duration field and a Dynamic Allocation Info field, the Dynamic Allocation Info field including an allocation duration subfield and an access mode subfield, the access mode subfield to indicate an access mode of an allocation according to the grant frame; and to transmit the grant frame.

38 Claims, 5 Drawing Sheets

(56) References Cited

U.S. PATENT DOCUMENTS

| | | | |
|---|---|---|---|
| 2012/0177013 A1 | 7/2012 | Trainin et al. | |
| 2013/0003689 A1 | 1/2013 | Kwon et al. | |
| 2013/0163496 A1 | 6/2013 | Trainin et al. | |
| 2013/0176993 A1 | 7/2013 | Trainin et al. | |
| 2013/0287043 A1 | 10/2013 | Nanda et al. | |
| 2015/0063257 A1* | 3/2015 | Merlin | H04L 47/12 370/329 |
| 2015/0063318 A1 | 3/2015 | Merlin et al. | |
| 2016/0165635 A1* | 6/2016 | Trainin | H04W 72/14 370/336 |
| 2016/0198445 A1 | 7/2016 | Ghosh et al. | |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2016/014246, dated May 4, 2016, 10 pages.

Office Action for U.S. Appl. No. 14/749,665 dated Oct. 6, 2016, 12 pages.

International Preliminary Report on Patentability for PCT /US2016/014246, dated Aug. 31, 2017, 6 pages.

European Search Report for European Patent Application No. 16752771.2, dated Aug. 30, 2018, 15 pages.

Solomon Trainin (INTEL): "802.11ad Grant frame related clarifications; 11-15-0253-00-000m-802-11ad-grant-frame-related-clarifications", IEEE Draft; 11-15-0253-00-000M-802-11AD-Grant-Frame-Related-Clarifications, IEEE-SA Mentor, Piscataway, NJ USA, vol. 802.11m, Mar. 10, 2015 (Mar. 10, 2015), pp. 1-6, XP068082843, [retrieved on Mar. 10, 2015], 6 pages.

"ISO/IEC/IEEE International Standard for Information technology—Telecommunications and information exchange between systems—Local and metropolitan area networks—Specific requirements-Part 11: Wireless LAN Medium Access Control (MAC) and Physical Layer (PHY) Specifications Amendment 3: Enhancements", IEEE Standard, IEEE, Piscataway, NJ, USA, Mar. 14, 2014 (Mar. 14, 2014), pp. 1-634, XP068070330, ISBN: 978-0-7381-9032-7 , 634 pages.

* cited by examiner

APPARATUS, SYSTEM AND METHOD OF INDICATING A TIME OFFSET USING A GRANT FRAME

CROSS REFERENCE

This application claims the benefit of and priority from U.S. Provisional Patent Application No. 62/119,200 entitled "Apparatus, System and Method of Dynamic Allocation Using a Grant Frame", filed Feb. 22, 2015, the entire disclosure of which is incorporated herein by reference.

TECHNICAL FIELD

Embodiments described herein generally relate to dynamic allocation using a grant frame.

BACKGROUND

A wireless communication network in a millimeter-wave band may provide high-speed data access for users of wireless communication devices.

A wireless communication station may communicate a grant frame, which may include fields and subfields configured for time allocation purposes. For example, the grant frame may be configured according to IEEE 802.11*ad*-2012 ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012).

However, the current definition of fields and subfields of the grant frame according to *IEEE* 802.11*ad*-2012 may not be applicable, efficient and/or sufficient, e.g., at least in some scenarios and/or use cases.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
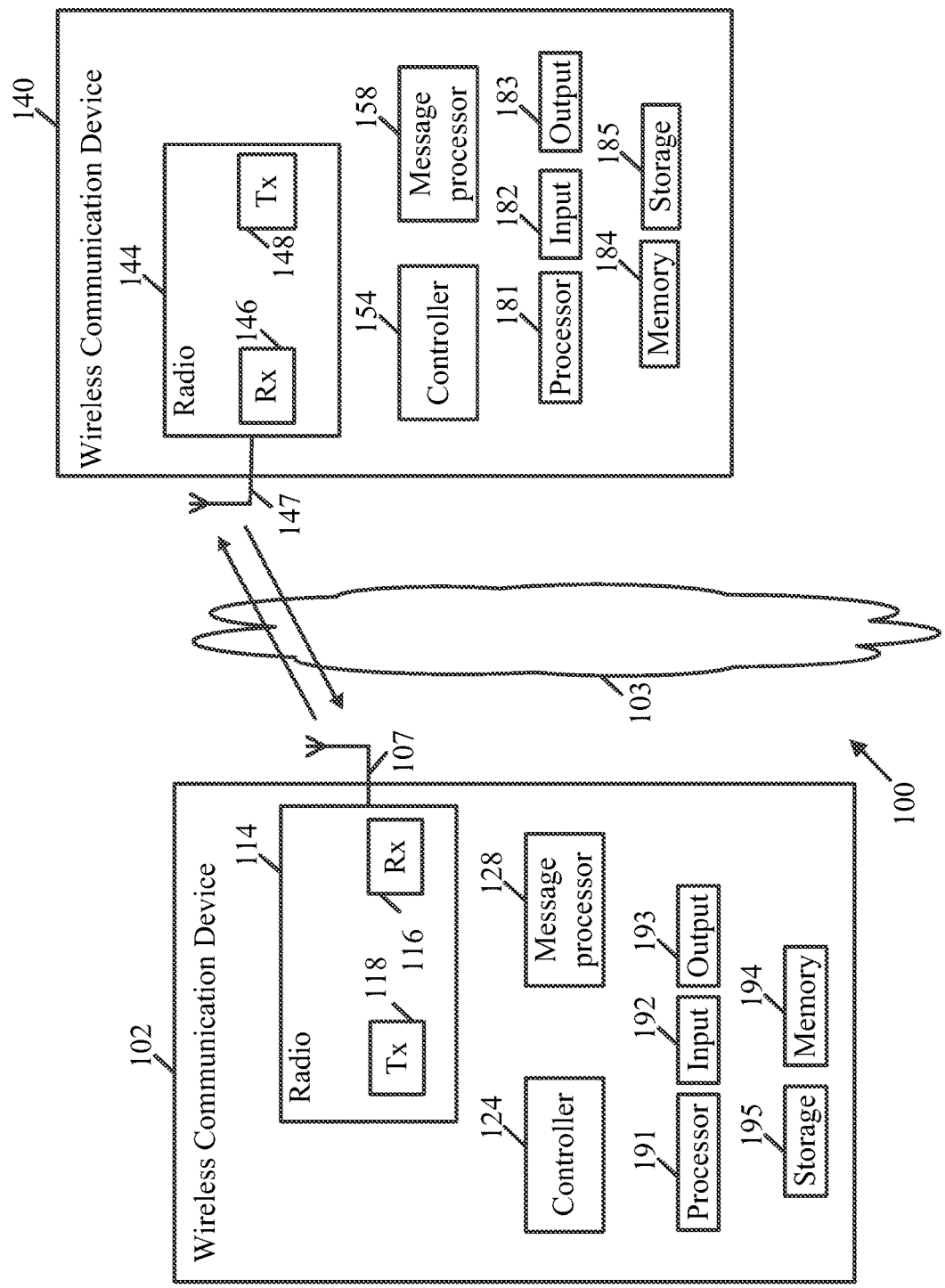
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN*

Medium Access Control (MAC) and Physical Layer (PHY) Specifications, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations, e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC)

circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and 140 may be configured to perform operations of dynamical scheduling and/or allocation, e.g., as described below.

In some demonstrative embodiments, devices 102 and/or 140 may be configured to perform dynamic allocation of a service period (SP), for example, to provide a solution to allocate channel time during scheduled service periods (SPs), during different types of contention based access periods (CBAPs), and/or any other periods.

In some demonstrative embodiments, dynamic scheduling of an allocated time may be provided to a station, for example, using a grant frame, e.g., as described below.

In some demonstrative embodiments, controller 124 may cause radio 114 to generate, process and/or transmit a grant frame, e.g., to device 140 and/or to one or more other devices, for example, to dynamically allocate a time period, e.g., to device 140 and/or to one or more other devices, e.g., as described below.

In some demonstrative embodiments, radio 144 may receive the grant frame, and controller 154 may process the grant frame, and may perform one or more operations according to the contents of the grant frame. For example, controller 154 may control communications by device 140 according to the allocated time period allocated by the grant frame. In one example, controller 154 may cause device 140 to communicate during the allocated time period, for example, if the allocated time period is to be allocated for communications by device 140, e.g., as described below.

In some demonstrative embodiments, the grant frame may be generated and/or transmitted by an AP, a PCP, an AP/PCP STA, a non-AP STA, a non-PCP STA, and/or a non-AP/PCP STA.

In some demonstrative embodiments, the grant frame may be addressed to, received by, and/or processed by, an AP, a PCP, an AP/PCP STA, a non-AP STA, a non-PCP STA, and/or a non-AP/PCP STA.

In some demonstrative embodiments, the Grant frame may include fields and/or subfields, which may be configured for time allocation and/or scheduling purposes.

In one example, configuring fields and/or subfields of a grant frame according to a conventional grant frame format, for example, a grant frame format in accordance with an IEEE 802.11 Standard, for example, *IEEE 802.11ad-2012* ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012), may not be applicable, efficient and/or sufficient, for example, to cover all cases and/or scenarios the grant frame may be used for.

In one example, configuring fields and/or subfields of a grant frame according to a conventional grant frame format, for example, a grant frame format in accordance with *IEEE 802.11ad-2012*, may not be sufficient and/or efficient to enable using the grant frame, for example, when exchanging the grant frame between peer stations ("peers") in condition of multiple accesses, e.g., during a Contention based Access Period (CBAP). No solution is known to enable such an exchange, e.g., in accordance with the frame format defined by IEEE 802.11ad-2012. This is only one example, and there may be additional scenarios and/or use cases, in which the conventional format of the grant frame may not be applicable, sufficient and/or efficient.

In some demonstrative embodiments, a field in the grant frame, for example, a field of an allocation duration or any other field in the grant frame, may be defined and/or used, for example, depending on one or more attributes of a scheduling to be performed by the grant frame, e.g., as described below.

In some demonstrative embodiments, a field in the grant frame, for example, a field of an allocation duration or any other field in the grant frame, may be defined and/or used, for example, depending on whether the grant frame is to be used for scheduling purposes by an AP STA or PCP STA, or whether the grant frame is to be used to communicate in advance access between peers, for example, non-AP/PCP STAs, e.g., as described below.

In some demonstrative embodiments, a device transmitting the grant frame, e.g., device 102, may be configured to indicate a use of the allocation duration field in the grant frame, for example, to a receiver of the grant frame, e.g., device 140, as described below.

In one example, the device transmitting the grant frame, e.g., device 102, may be configured to indicate the use of the allocation duration field in the grant frame, for example, in a manner, which may enable a stateless interpretation of the field, e.g., by the receiver of the grant frame.

Some demonstrative embodiments may be implemented, for example, to allow using the same format of the grant frame, for example, even with respect to different types of access allocations, and/or may allow delivering information relevant for a specific access type, for example, a service period, an allocated CBAP, a "CBAP only" allocation, and/or any other access period, e.g., even if not supported by a conventional solution.

Figure 2:
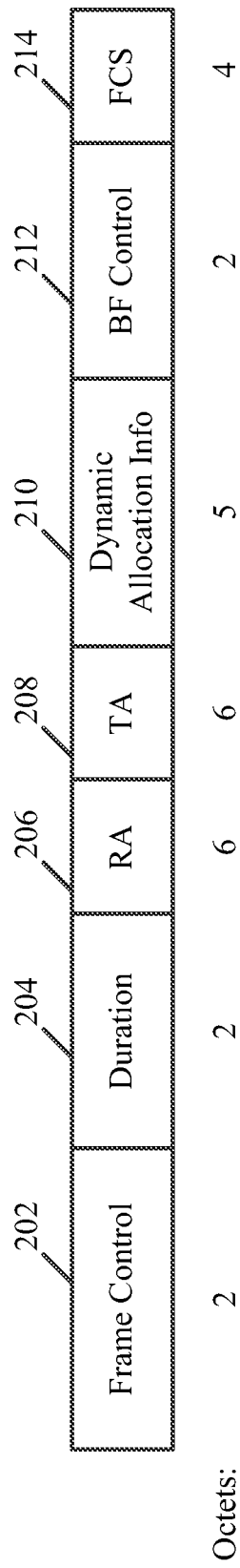
FIG. 2 is a schematic illustration of a grant frame, in accordance with some demonstrative embodiments.

FIG. 2 is a schematic illustration of a grant frame 200, in accordance with some demonstrative embodiments.

In some demonstrative embodiments, the grant frame 200 may be transmitted by a device, e.g., device 102 (FIG. 1), and received by a device, e.g., device 140 (FIG. 1).

In some demonstrative embodiments, grant frame 200 may include a Frame Control (FC) field 202, for example, including 2 octets, e.g., 16 bits.

In some demonstrative embodiments, grant frame 200 may include a Duration/ID field 204, for example, following FC field 202, and including, for example, 2 octets, e.g., 16 bits.

In some demonstrative embodiments, Duration/ID field 204 may include a duration value, e.g., as described below.

In some demonstrative embodiments, grant frame 200 may include a Receive Address (RA) field 206, for example, following duration field 204, and including, for example, 6 octets, e.g., 48 bits. In one example RA field 206 may include, for example, an address, e.g., a Media Access Control (MAC) address, of a STA to receive grant frame 200.

In some demonstrative embodiments, grant frame 200 may include a Transmit Address (TA) field 208, for example, following RA field 206, and including, for example, 6 octets, e.g., 48 bits. In one example TA field 208 may include, for example, an address, e.g., a MAC address, of a STA to transmit grant frame 200.

In some demonstrative embodiments, grant frame 200 may include a Dynamic Allocation Info field 210, for example, following TA field 208, and including, for example, 5 octets, e.g., 40 bits.

In some demonstrative embodiments, grant frame 200 may include a Beamforming (BF) control field 212, for example, following Dynamic Allocation Info field 210, and including, for example, 2 octets, e.g., 16 bits.

In some demonstrative embodiments, grant frame 200 may include a Frame Check Sequence (FCS) field 214, for example, following BF control field 212, and including, for example, 4 octets, e.g., 32 bits.

Figure 3:
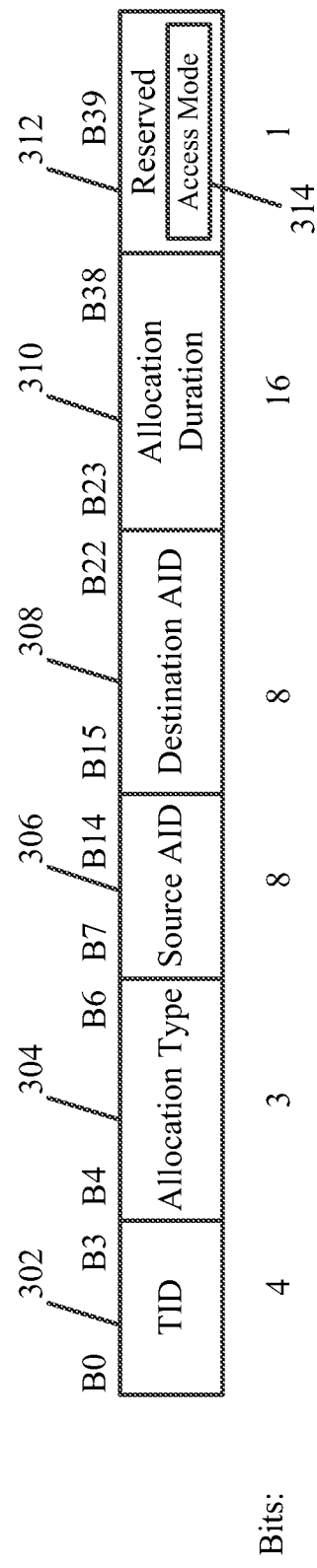
FIG. 3 is a schematic illustration of a dynamic allocation information field, in accordance with some demonstrative embodiments.

FIG. 3 is a schematic illustration of a dynamic allocation information field 300, in accordance with some demonstrative embodiments. For example, the grant frame 200 of FIG. 2 may include the dynamic allocation information field 300 of FIG. 3.

In some demonstrative embodiments, dynamic allocation information field 300 may include a Traffic Identifier (TID) subfield 302, e.g., including 4 bits.

In some demonstrative embodiments, dynamic allocation information field 300 may include an Allocation type subfield 304, for example, following TID subfield 302, and including, for example, 3 bits.

In some demonstrative embodiments, dynamic allocation information field 300 may include a Source Association Identifier (AID) subfield 306, for example, following Allocation type subfield 304, and including, for example, 8 bits.

In some demonstrative embodiments, dynamic allocation information field 300 may include a Destination AID subfield 308, for example, following Source AID subfield 306, and including, for example, 8 bits.

In some demonstrative embodiments, dynamic allocation information field 300 may include an allocation duration subfield 310, for example, following Destination AID subfield 308, and including, for example, 16 bits.

In some demonstrative embodiments, dynamic allocation information field 300 may include an access mode indication subfield 314, which may be configured, for example, to indicate an access mode of an allocation according to a grant frame, e.g., grant frame 200 (FIG. 2), which includes dynamic allocation information field 300, e.g., as described below.

In some demonstrative embodiments, as shown in FIG. 3, access mode subfield 314 may have a size of one bit.

In some demonstrative embodiments, as shown in FIG. 3, access mode subfield 314 may be included as part of, or instead of, a reserved subfield 312 of dynamic allocation information field 300. In other embodiments, access mode subfield 314 may be included in the form of, as part of, or instead of, any other subfield of dynamic allocation information field 300.

In some demonstrative embodiments, some settings of the fields and/or subfields of the grant frame, for example, in accordance with an IEEE 802.11 Standard, e.g., according to *IEEE* 802.11*ad*-2012, may be suitable for only some scenarios. For example, in one scenario, the Allocation Duration subfield 310 of the Dynamic Allocation Info field 300 may be set to include a granted duration of a SP or CBAP allocation, e.g., in microseconds, and duration field 214 (FIG. 2) of the Grant frame 200 (FIG. 2) may be defined to cover a time to transmit remaining Grant frame(s), if required, a related inter frame spacing (IFS), and the Allocation Duration carried in the Dynamic Allocation Info field 210 (FIG. 2).

For example, such settings may be best suited, for example, to a specific scenario of delivering SP and/or CBAP allocations, for example, by an AP STA or a PCP STA, for example, to one or more non-AP and/or non-PCP STAs.

In some demonstrative embodiments, devices 102 and/or 140 (FIG. 1) may be configured to be able to use the grant frame 200 (FIG. 2) and/or dynamic allocation information field 300 with respect to one or more additional or alternative implementations, situations, procedures, operations, and/or scenarios, which may not be limited to only this specific scenario.

In some demonstrative embodiments, devices 102 and/or 140 (FIG. 1) may be configured to use one or more fields and/or subfields of the grant frame 200 (FIG. 2) and/or dynamic allocation information field 300, for example, to allocate and/or schedule one or more additional and/or alternative types of access periods, and/or to enable using the grant frame 200 (FIG. 1) by one or more other types of devices and/or stations, and/or for one or more other purposes, use cases, and/or scenarios, e.g., as described below.

In some demonstrative embodiments, a transmitter of grant frame 200 (FIG. 2), e.g., device 102 (FIG. 1), may be configured to generate and/or set access mode subfield 314 to encode an indication of one or more conditions to interpret the one or more fields of grant frame 200 (FIG. 2), e.g., duration field 204 (FIG. 2), and/or one or more subfields of dynamic allocation information field 300, e.g., allocation duration subfield 310, e.g., as described below.

In some demonstrative embodiments, a subfield of the dynamic allocation info field 300, for example, the reserved subfield 312, may be configured to include access mode subfield 314, for example, to encode an indication of one or more conditions to interpret the Allocation Duration subfield 310, e.g., as described below.

In other embodiments, devices 102 and/or 140 (FIG. 1) may use any other subfield of the dynamic allocation info field 300 to encode an indication of one or more conditions to interpret the allocation duration subfield 310. In one example, a new, e.g., additional, subfield may be added to the dynamic allocation info field 300, for example, subsequent to the allocation duration subfield 310, or in any other location.

Referring back to FIG. 1, in some demonstrative embodiments, a device, e.g., device 102 (FIG. 1), transmitting a grant frame, e.g., the grant frame 200 (FIG. 2), may be configured to set a value of the access mode subfield of the dynamic allocation info field 300 (FIG. 3), e.g., access mode subfield 314 (FIG. 3), to indicate how one or more subfields of the grant frame are to be interpreted and/or used, e.g., as described below.

In some demonstrative embodiments, a device receiving the grant frame, e.g., device 140 (FIG. 1), may be configured to process the value of the access mode subfield of the dynamic allocation info field, e.g., access mode subfield 314 (FIG. 3), for example, to determine the access mode and/or type to be allocated and/or scheduled by the grant frame, e.g., as described below.

In some demonstrative embodiments, controller 124 may be configured to cause a wireless station, for example, a wireless station implemented by device 102, to generate a grant frame, for example, grant frame 200 (FIG. 2), including a duration field, e.g., duration field 204 (FIG. 2), and a dynamic allocation info field, e.g., dynamic allocation info field 210 (FIG. 2).

In some demonstrative embodiments, controller 124 may be configured to cause a wireless station to generate the dynamic allocation info field, e.g., dynamic allocation info field 300 (FIG. 3), including an allocation duration subfield, e.g., allocation duration subfield 310 (FIG. 3), and an access mode subfield, e.g., access mode subfield 314 (FIG. 3).

In some demonstrative embodiments, controller 124 may be configured to cause the wireless station to generate the access mode subfield, e.g., access mode subfield 314, to indicate an access mode of an allocation according to the grant frame, for example, an access mode to be allocated by grant frame 200 (FIG. 2), e.g., as described below.

In some demonstrative embodiments, controller 124 may be configured to cause the wireless station to transmit the grant frame. For example, controller 124 may cause radio 114 to process transmission the grant frame 200 (FIG. 2).

In some demonstrative embodiments, controller 124 may be configured to cause the wireless station to transmit the grant frame, e.g., grant frame 200 (FIG. 2), including dynamic allocation info subfield 300 (FIG. 3), which includes access mode subfield 314 (FIG. 3), for example, as a non-AP/PCP station (STA).

In some demonstrative embodiments, controller 124 may be configured to cause the wireless station to transmit the grant frame, e.g., grant frame 200 (FIG. 2), including dynamic allocation info subfield 300 (FIG. 3), which includes access mode subfield 314 (FIG. 3), for example, as an AP/PCP station (STA).

In other embodiments, controller 124 may be configured to cause the wireless station to transmit the grant frame, e.g., grant frame 200 (FIG. 2), including dynamic allocation info subfield 300 (FIG. 3), which includes access mode subfield 314 (FIG. 3), for example, as any other DMG STA or any other STA.

In some demonstrative embodiments, controller 124 may be configured to cause the wireless station to transmit the grant frame, e.g., grant frame 200 (FIG. 2), including dynamic allocation info subfield 300 (FIG. 3), which includes access mode subfield 314 (FIG. 3), for example, during a Contention-Based Access period (CBAP).

In other embodiments, controller 124 may be configured to cause the wireless station to transmit the grant frame, e.g., grant frame 200 (FIG. 2), including dynamic allocation info subfield 300 (FIG. 3), which includes access mode subfield 314 (FIG. 3), for example, during any other allocation, period, and/or mode.

In some demonstrative embodiments, controller 124 may be configured to cause the wireless station to set the access mode subfield, e.g., access mode subfield 314 (FIG. 3), to a predefined value, which may be configured to indicate that the grant frame is to indicate a time of an attempt to obtain a future TxOP, for example, between a first STA and a second STA. The first STA may include a STA transmitting the grant frame, for example, a STA having an address indicated by TA field 208 (FIG. 2), e.g., the STA implemented by device 102; and/or the second STA may include, for example, a STA having an address indicated by the RA field 206 (FIG. 2), e.g., the STA implemented by device 140.

In some demonstrative embodiments, controller 124 may be configured to cause the wireless station to set the access mode subfield, e.g., access mode subfield 314 (FIG. 3), to a predefined value, which may be configured to indicate that a start time of an attempt to obtain a TxOP is to be determined based on a sum of a value in the allocation duration subfield, e.g., allocation duration subfield 310 (FIG. 3), and a value in the duration field, e.g., duration field 214 (FIG. 2).

In some demonstrative embodiments, the predefined value may be "1". For example, controller 124 may be configured to cause the wireless station to set the access mode subfield, e.g., access mode subfield 314 (FIG. 3), to the value of "1", to indicate that a start time of an attempt to obtain a TxOP is to be determined based on a sum of a value in the allocation duration subfield, e.g., allocation duration subfield 310 (FIG. 3), and a value in the duration field, e.g., duration field 214 (FIG. 2).

In some demonstrative embodiments, the start time of the attempt to obtain the TxOP may be determined, for example, based on the sum of the value in allocation duration subfield 310 (FIG. 3), and the value in duration field 214 (FIG. 2), and based on a Physical Layer (PHY) Transmit end (PHY.TXEND) indication, e.g., as described below.

In some demonstrative embodiments, controller 124 may be configured to cause the wireless station to generate and/or set the access mode subfield 314 (FIG. 3), for example, as follows:

TABLE 1

| Access Mode | |
|---|---|
| CBAP definition in an Extended schedule element or in a DMG beacon | Access mode value |
| CBAP with Destination Association Identifier (AID) equal to broadcast AID or in a DMG parameters field of a Beacon interval (BI) introduced by DMG beacon with CBAP only subfield is set to 1 | 1 |
| Any other CBAP definitions | 0 |

In some demonstrative embodiments, controller 124 may be configured to cause the wireless station to generate and/or set the access mode subfield 314 (FIG. 3), for example, to indicate a use of the allocation duration subfield 310 (FIG. 3), for example, as described below. In other embodiments, any additional or alternative use may be defined.

In some demonstrative embodiments, when the Dynamic Allocation Info subfield is transmitted within a Grant frame with the access mode subfield equal to 0, for example, by an AP or PCP STA, e.g., during a Grant period (GP) and/or an announcement transmission interval (ATI), the Allocation Duration subfield may contain the granted duration of SP or CBAP allocations.

In some demonstrative embodiments, controller 124 may be configured to cause the wireless station implemented by device 102 to perform the functionality of an AP or PCP STA, and to generate and transmit a grant frame 200 (FIG. 2), for example, during a Grant period (GP) and/or an announcement transmission interval (ATI), for example, to allocate a SP or CBAP allocation.

According to these embodiments, controller 124 may be configured to cause the wireless station implemented by device 102 to set the allocation duration subfield 310 (FIG. 3) to include a value representing the granted duration of the SP or CBAP allocation.

According to these embodiments, controller 124 may be configured to cause the wireless station implemented by device 102 to set access mode subfield 314 (FIG. 3), for example, to the value of "0", e.g., to indicate that the allocation duration subfield 310 (FIG. 3) is to include the granted duration of the SP or CBAP allocation.

In some demonstrative embodiments, the Dynamic Allocation Info subfield may be transmitted within a Grant frame with the Access Mode subfield equal to 1, for example, by a STA, e.g., to indicate a time the STA is attempting to obtain a Transmit Opportunity (TXOP). According to these embodiments, e.g., when the Access Mode subfield equal to 1, the sum of the value in the Allocation Duration field plus a value in the Duration field of the grant frame, may indicate the time, for example, in relation to a PHY-TXEND.indication primitive of the Grant frame.

In some demonstrative embodiments, controller 124 may be configured to cause the wireless station implemented by device 102 to perform the functionality of a STA, e.g., a PCP/AP STA or a non-PCP/AP STA; and to generate and transmit a grant frame 200 (FIG. 2), for example, to indicate a start time of an attempt to obtain a TxOP.

According to these embodiments, controller 124 may be configured to cause the wireless station implemented by device 102 to set the allocation duration subfield 310 (FIG. 3) and/or duration field 214 (FIG. 2) to include values representing an offset to be used in calculation of a start time of the attempt to obtain the TxOP.

According to these embodiments, controller 124 may be configured to cause the wireless station implemented by device 102 to set access mode subfield 314 (FIG. 3), for example, to the value of "1", e.g., to indicate that the start time of the attempt to obtain the TxOP, for example, in relation to the PHY-TXEND.indication primitive of the grant frame 200 (FIG. 2), is to be determined, for example, based on the sum of the value in the allocation duration subfield 310 (FIG. 3) and the value in the duration field 214 (FIG. 2).

In some demonstrative embodiments, controller 154 may be configured to cause a wireless station, for example, a wireless station implemented by device 140, to process reception of a grant frame ("the received grant frame"). For example, controller 154 may cause radio 144 and/or message processor 158 to process reception of the frame.

In one example, the received grant frame may include the frame transmitted by device 102.

In some demonstrative embodiments, controller 154 may be configured to cause a wireless station, for example, a wireless station implemented by device 140, to process reception of a received grant frame, for example, grant frame 200 (FIG. 2), including a duration field, e.g., duration field 204 (FIG. 2), and a Dynamic Allocation Info field, e.g., dynamic allocation info field 210 (FIG. 2).

In some demonstrative embodiments, controller 154 may be configured to cause the wireless station to process the dynamic allocation info field, e.g., dynamic allocation info field 300 (FIG. 3), including an allocation duration subfield, e.g., allocation duration subfield 310 (FIG. 3), and an access mode subfield, e.g., access mode subfield 314 (314).

In some demonstrative embodiments, controller 154 may be configured to cause the wireless station to process the received grant frame, e.g., grant frame 200 (FIG. 2), including dynamic allocation info subfield 300 (FIG. 3), which includes access mode subfield 314 (FIG. 3), for example, as a non-AP/PCP station (STA).

In some demonstrative embodiments, controller 154 may be configured to cause the wireless station to process the received grant frame, e.g., grant frame 200 (FIG. 2), including dynamic allocation info subfield 300 (FIG. 3), which includes access mode subfield 314 (FIG. 3), for example, as an AP/PCP station (STA).

In other embodiments, controller 154 may be configured to cause the wireless station to process the received grant frame, e.g., grant frame 200 (FIG. 2), including dynamic allocation info subfield 300 (FIG. 3), which includes access mode subfield 314 (FIG. 3), for example, as any other DMG STA or any other STA.

In some demonstrative embodiments, controller 154 may be configured to cause the wireless station to process the received grant frame, e.g., grant frame 200 (FIG. 2), including dynamic allocation info subfield 300 (FIG. 3), which includes access mode subfield 314 (FIG. 3), for example, during a Contention-Based Access period (CBAP).

In other embodiments, controller 154 may be configured to cause the wireless station to process the received grant frame, e.g., grant frame 200 (FIG. 2), including dynamic allocation info subfield 300 (FIG. 3), which includes access mode subfield 314 (FIG. 3), for example, during any other allocation, period, and/or mode.

In some demonstrative embodiments, controller 154 may be configured to cause the wireless station to process the access mode subfield, e.g., access mode subfield 314 (FIG. 3), to determine an access mode of an allocation according to the grant frame, for example, an access mode to be allocated and/or scheduled by grant frame 200 (FIG. 2), e.g., as described above.

In some demonstrative embodiments, controller 154 may be configured to cause the wireless station to operate according to the access mode indicated by the access mode subfield.

In some demonstrative embodiments, controller 154 may be configured to cause the wireless station to determine a start time of an attempt to obtain a TxOP, for example, when the access mode subfield, e.g., access mode subfield 314 (FIG. 3), includes a predefined value, e.g., the value "1".

In some demonstrative embodiments, controller 154 may be configured to cause the wireless station to determine the start time of the attempt to obtain the TxOP, for example, based on a sum of a value in the allocation duration subfield, e.g., allocation duration subfield 310 (FIG. 3), and a value in the duration field, e.g., duration field 204 (FIG. 2), for example, when the access mode subfield, e.g., access mode subfield 314 (FIG. 3), includes the predefined value, e.g., the value "1".

In some demonstrative embodiments, controller 154 may be configured to cause the wireless station to determine the start time of the attempt to obtain the TxOP, for example, in relation to the PHY-TXEND.indication primitive of the grant frame 200 (FIG. 2).

In some demonstrative embodiments, controller 154 may be configured to cause the wireless station to determine the start time of the attempt top obtain the TxOP, for example, based on the sum of the value in allocation duration subfield 310 (FIG. 3), and the value in duration field 214 (FIG. 2), and based on the PHY.TXEND indication of the grant frame 200 (FIG. 2), e.g., as described below.

In some demonstrative embodiments, controller 154 may be configured to cause the wireless station to process the received grant frame based on the access mode subfield 314 (FIG. 3), for example, in accordance with Table 1.

In some demonstrative embodiments, devices 102 may be configured to generate and/or set access mode subfield 314 (FIG. 1) to encode an indication of one or more conditions to interpret the one or more fields of grant frame 200 (FIG. 2), e.g., duration field 204 (FIG. 2), and/or one or more subfields of dynamic allocation information field 300, e.g., allocation duration subfield 310; and/or device 140 may be configured to process one or more fields of grant frame 200 (FIG. 2), e.g., duration field 204 (FIG. 2), and/or one or more subfields of dynamic allocation information field 300 (FIG. 3), e.g., allocation duration subfield 310 (FIG. 3), for example, based on access mode subfield 314 (FIG. 3), e.g., as described above.

In some demonstrative embodiments, devices 102 and/or 140 may be configured to use another manner, for example, instead of, or in addition to, the Access Mode indication 314 (FIG. 3), of indicating the one or more conditions to interpret and/or process one or more fields of grant frame 200 (FIG. 2), e.g., duration field 204 (FIG. 2), and/or one or more subfields of dynamic allocation information field 300 (FIG. 3), e.g., allocation duration subfield 310 (FIG. 3), e.g., as described below.

In some demonstrative embodiments, device 102 may be configured to set a combination of at least first and second fields and/or subfields of a grant frame, e.g., grant frame 200 (FIG. 2), to indicate that the grant frame is to indicate a start time of a future attempt to obtain a TxOP, for example, between a first STA, e.g., the STA implemented by device 102, and a second STA, e.g., the STA implemented by device 140, e.g., as described below.

In some demonstrative embodiments, device 140 may be configured to determine that a grant frame, e.g., grant frame 200 (FIG. 2), is to indicate an attempt to obtain a future TxOP, for example, between a first STA, e.g., the STA implemented by device 102, and a second STA, e.g., the STA implemented by device 140, for example, based on a combination of at least first and second fields and/or subfields of the grant frame, e.g., as described below.

In some demonstrative embodiments, devices 102 and/or 140 may be configured to use a predefined combination and/or relationship of a Source AID, e.g., Source AID field 306 (FIG. 3), and a Destination AID, e.g., Destination AID field 308 (FIG. 3), in a grant frame, e.g., grant frame 200 (FIG. 2), for example, to indicate that the grant frame is to allocate and/or schedule a future TxOP.

In some demonstrative embodiments, devices 102 and/or 140 may be configured to use a predefined combination and/or relationship of a Source AID, e.g., Source AID field 306 (FIG. 3), and a Destination AID, e.g., Destination AID field 308 (FIG. 3), in a grant frame, e.g., grant frame 200 (FIG. 2), for example, to indicate that the time a STA attempts to obtain a future TXOP may be defined, for example, based on the sum of the value in the Allocation Duration field plus a value in the Duration field. For example, the start time of the attempt to obtain the TxOP may be defined in relation to the PHY-TXEND.indication primitive of the grant frame.

In some demonstrative embodiments, controller 124 may be configured to cause a STA implemented by device 102 to set a combination of the Source AID field 306 (FIG. 3) and the Destination AID field 308 (FIG. 3) in a grant frame, e.g., grant frame 200 (FIG. 2), to indicate that the grant frame is to allocate and/or schedule a future TxOP, for example, between a STA having an address indicated by TA field 208 (FIG. 3), e.g., the STA implemented by device 102, and a receiver of the grant frame, e.g., a STA having an address indicated by RA field 206 (FIG. 2).

In some demonstrative embodiments, controller 154 may be configured to cause a STA implemented by device 140 to determine that a grant frame, e.g., grant frame 200, is to indicate a start time of an attempt to obtain a future TxOP, for example, between the STA implemented by device 140, e.g., a STA having the address indicated by RA field 206 (FIG. 2) and a STA having an address indicated by TA field 208 (FIG. 2), for example, if the Source AID field 306 (FIG. 3) and the Destination AID field 308 (FIG. 3) of the grant frame are set to a predefined combination of values.

In some demonstrative embodiments, a STA sending the grant frame, e.g., device 102, may set a value of the Destination AID field 308 (FIG. 3) to be equal to a broadcast AID, and a value in the Source AID field 306 (FIG. 3) to be equal to an AID of the STA that sends the grant frame, e.g., the STA implemented by device 102, for example, to indicate the case of obtaining the TxOP, e.g., as follows:

TABLE 2

| Allocation Mode | Source AID | Destination AID | rule |
|---|---|---|---|
| 1 | Unicast AID of an originating STA | Broadcast AID | value in the Allocation Duration field plus a value in the Duration field indicates time to obtain TXOP |
| 1 | Broadcast AID | Any value | Another defined behavior |
| 1 | Unicast AID | Unicast AID | Another defined behavior |
| 0 | Any value | Any value | Another defined behavior |

In some demonstrative embodiments, the STA sending the grant frame, e.g., device 102, may set a value of the Destination AID field 308 (FIG. 3), and/or a value in the Source AID field 306 (FIG. 3) to one or more other combinations of values, e.g., according to Table 2, to indicate one or more other types of allocations and/or interpretations of one or more fields and/or subfields of the grant frame.

In some demonstrative embodiments, controller 124 may be configured to cause a wireless station, for example, a wireless station implemented by device 102, to generate a grant frame, for example, grant frame 200 (FIG. 2), including a Source AID field, e.g., Source AID field 306 (FIG. 3), a Destination AID field, e.g., Destination AID field 308 (FIG. 3), a duration field, e.g., duration field 204 (FIG. 2), and a Dynamic Allocation Info field, e.g., Dynamic Allocation Info field 210 (FIG. 2), including an allocation duration subfield, e.g., allocation duration subfield 310 (FIG. 3).

In some demonstrative embodiments, controller 124 may be configured to cause the wireless station to set the Source AID field and the Destination AID field to indicate that a start time of an attempt to obtain a TxOP is to be determined based on a sum of a value of the allocation duration subfield and a value of the duration field, e.g., according to Table 2.

In some demonstrative embodiments, controller 124 may be configured to cause the wireless station to set the Source AID field 306 (FIG. 3) to a unicast AID of the wireless station implemented by device 102, and to set the Destination AID field 308 (FIG. 3) to a broadcast AID, e.g., to indicate that the start time of the attempt to obtain the TxOP is to be determined based on the sum of the value of the allocation duration subfield 310 (FIG. 3) and a value of the duration field 204 (FIG. 2).

In some demonstrative embodiments, a device receiving the grant frame, e.g., device 140, may process the grant frame according to the relationship between the Source AID and Destination AID, e.g., according to Table 2.

In some demonstrative embodiments, controller 154 may be configured to cause a wireless station, for example, a wireless station implemented by device 140, to process a received grant frame, for example, grant frame 200 (FIG. 2), including a Source AID field, e.g., Source AID field 306 (FIG. 3), a Destination AID field, e.g., Destination AID field 308 (FIG. 3), a duration field, e.g., duration field 204 (FIG. 2), and a Dynamic Allocation Info field, e.g., Dynamic Allocation Info field 210 (FIG. 2), including an allocation duration subfield, e.g., allocation duration subfield 310 (FIG. 3).

In some demonstrative embodiments, controller 154 may be configured to cause the wireless station to determine a start time of an attempt to obtain a TxOP based on a sum of a value of the allocation duration subfield and a value of the duration field, for example, when the Source AID field and the Destination AID field have a predefined setting.

In some demonstrative embodiments, controller 154 may be configured to cause the wireless station to determine the start time of the attempt to obtain the TxOP, for example, based on the sum of the value of the allocation duration subfield 310 (FIG. 3) and the value of the duration field 204 (FIG. 2), for example, when the Source AID field 306 (FIG. 3) includes a unicast AID of the wireless station from which the grant frame 200 (FIG. 2) is received, and the Destination AID field 308 (FIG. 3) includes a broadcast AID.

Figure 4:
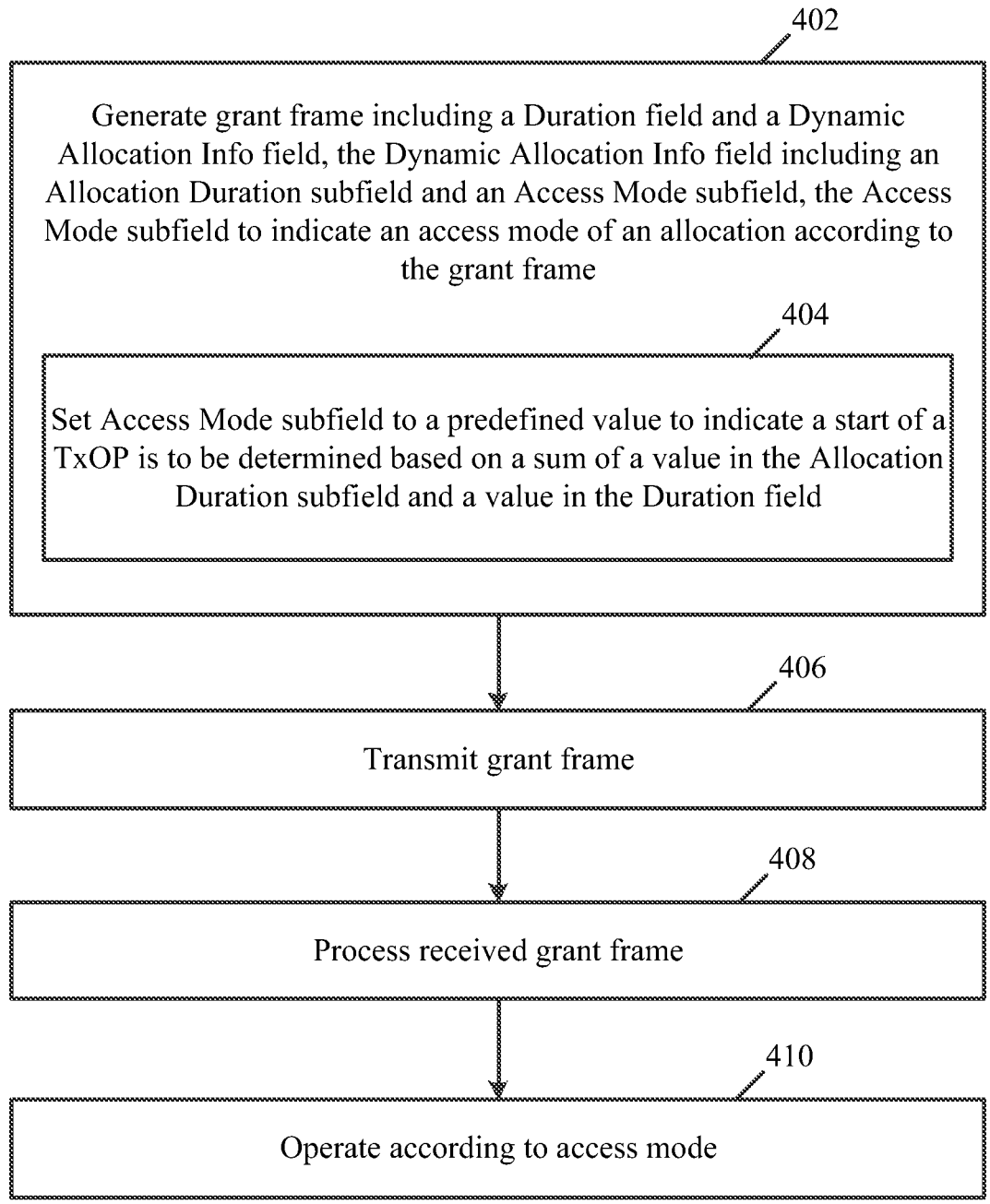
FIG. 4 is a schematic flow-chart illustration of a method of dynamic allocation using a grant frame, in accordance with some demonstrative embodiments.

Reference is made to FIG. 4, which schematically illustrates a method of dynamic allocation using a grant frame, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include generating a grant frame including a duration field and a Dynamic Allocation Info field, the Dynamic Allocation Info field including an allocation duration subfield and an access mode subfield, the access mode subfield to indicate an access mode of an allocation according to the grant frame. For example, controller 124 (FIG. 1) may cause message processor 128 (FIG. 1) to generate grant frame 200 (FIG. 2) including dynamic allocation info field 300 (FIG. 3), which may include access mode indication 314 (FIG. 3) to indicate the access mode of an allocation according to grant frame 200 (FIG. 2), e.g., as described above.

As indicated at bock 404, the method may include setting the access mode subfield to a predefined value to indicate that a start time of an attempt to obtain a TxOP is to be determined based on a sum of a value in the allocation duration subfield and a value in the duration field. For example, controller 124 (FIG. 1) may cause message processor 128 (FIG. 1) to set access mode indication 314 (FIG. 3) to the value "1", e.g., as described above.

As indicated at block 406, the method may include transmitting the grant frame. For example, controller 124 (FIG. 1) may cause radio 114 (FIG. 1) to transmit the grant frame 200 (FIG. 2), e.g., as described above.

As indicated at block 408, the method may include processing a received grant frame including a duration field and a Dynamic Allocation Info field, the Dynamic Allocation Info field including an allocation duration subfield and an access mode subfield, the access mode subfield to indicate an access mode of an allocation according to the grant frame. For example, controller 154 (FIG. 1) may control message processor 158 (FIG. 1) to process reception of grant frame 200 (FIG. 2) including dynamic allocation info field 300 (FIG. 3), which may include access mode indication 314 (FIG. 3) to indicate the access mode of an allocation according to grant frame 200 (FIG. 2), e.g., as described above.

As indicated at block 410, the method may include operating according to the access mode. For example, controller 154 (FIG. 1) may control one or more operations of device 140 (FIG. 1), for example, based on the access mode indicated by access mode indication 314 (FIG. 3), e.g., as described above.

Figure 5:
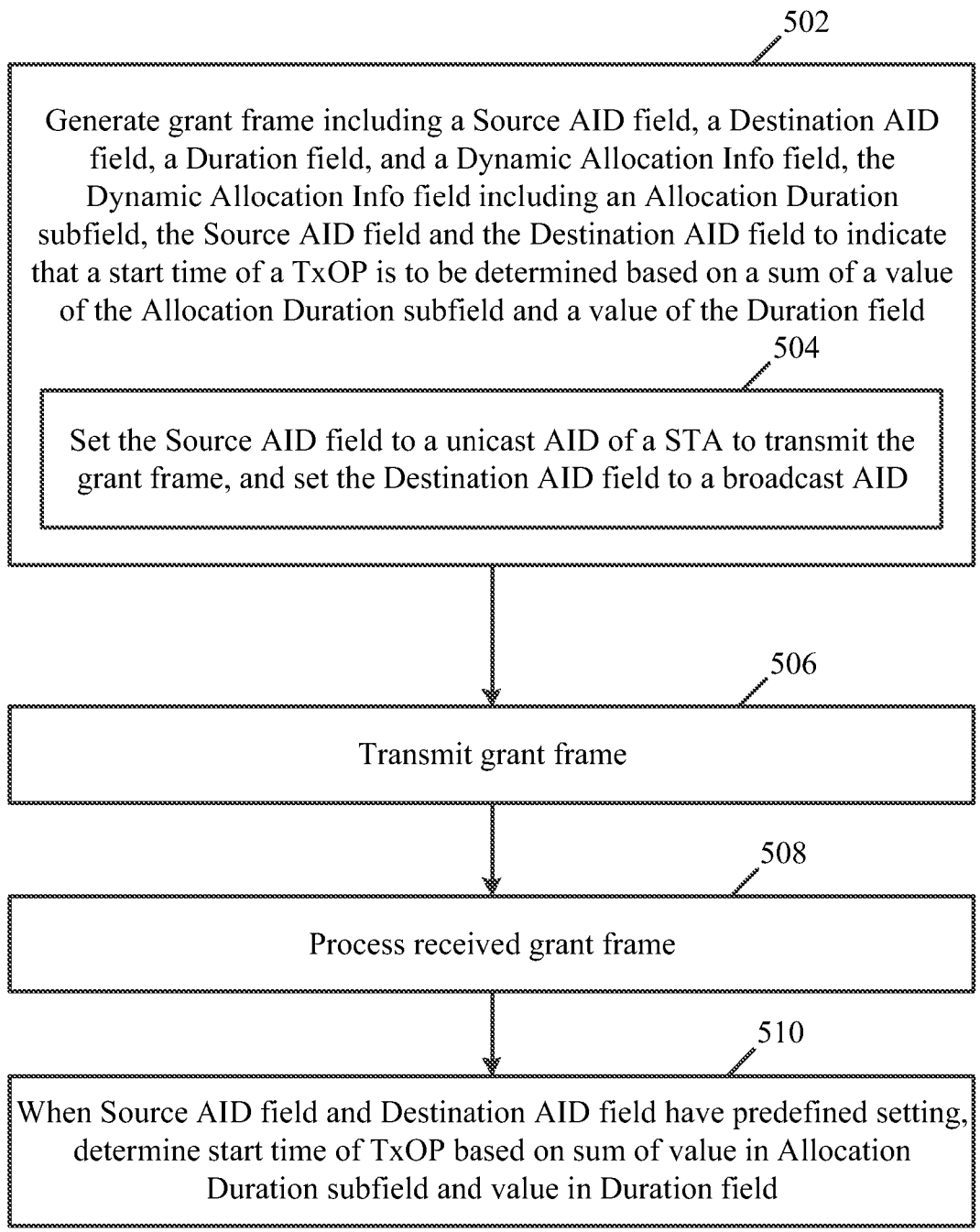
FIG. 5 is a schematic flow-chart illustration of a method of dynamic allocation using a grant frame, in accordance with some demonstrative embodiments.

Reference is made to FIG. 5, which schematically illustrates a method of dynamic allocation using a grant frame, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include generating a grant frame including a Source AID field, a Destination AID field, a duration field, and a Dynamic Allocation Info field, the Dynamic Allocation Info field including an allocation duration subfield, the Source AID field and the Destination AID field set to indicate that a start time of an attempt to obtain a TxOP is to be determined based on a sum of a value of the allocation duration subfield and a value of the duration field. For example, controller 124 (FIG. 1) may cause message processor 128 (FIG. 1) to generate grant frame 200 (FIG. 2) including dynamic allocation info field 300 (FIG. 3), which may include Source AID field 306 (FIG. 3) and Destination AID field 308 (FIG. 3) set to indicate that a start time of an attempt to obtain a TxOP is to be determined based on a sum of a value of the allocation duration subfield 310 (FIG. 3), and a value of the duration field 204 (FIG. 2), e.g., as described above.

As indicated at bock 504, the method may include setting the Source AID field to a unicast AID of a wireless station to transmit the grant frame, and setting the Destination AID field to a broadcast AID, for example, to indicate that the start time of the attempt to obtain a TxOP is to be determined based on the sum of the value of the allocation duration subfield and the value of the duration field. For example, controller 124 (FIG. 1) may cause message processor 128 (FIG. 1) to set Source AID field 306 (FIG. 3) to a unicast AID of the STA of device 102 (FIG. 1) to transmit the grant frame 200 (FIG. 2), and to set the Destination address field 308 (FIG. 3) to a broadcast AID, e.g., as described above.

As indicated at block 506, the method may include transmitting the grant frame. For example, controller 124 (FIG. 1) may cause radio 114 (FIG. 1) to transmit the grant frame 200 (FIG. 2), e.g., as described above.

As indicated at block 508, the method may include processing a received grant frame including a Source AID field, a Destination AID field, a duration field, and a Dynamic Allocation Info field, the Dynamic Allocation Info field including an allocation duration subfield. For example, controller 154 (FIG. 1) may control message processor 158 (FIG. 1) to process reception of grant frame 200 (FIG. 2) including dynamic allocation info field 300 (FIG. 3), which may include Source AID field 306 (FIG. 3) and Destination AID field 308 (FIG. 3), e.g., as described above.

As indicated at block 510, the method may include, when the Source AID field and the Destination AID field have a predefined setting, determining a start time of a TxOP based on a sum of a value of the allocation duration subfield and a value of the duration field. For example, controller 154 (FIG. 1) may determine a start time of an attempt to obtain a TxOP based on a sum of a value of the allocation duration subfield 310 (FIG. 3) and a value of the duration field 204 (FIG. 2), for example, when the Source AID field 306 (FIG. 3) is set to the unicast AID of a sender of grant frame 200 (FIG. 2) and the Destination AID field 308 (FIG. 3) is set to a broadcast AID, e.g., as described above.

Figure 6:
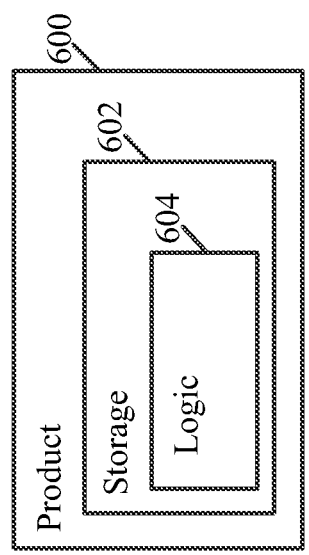
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), and/or to perform one or more operations of the methods of FIGS. 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to generate a grant frame comprising a duration field and a Dynamic Allocation Info field, the Dynamic Allocation Info field comprising an allocation duration subfield and an access mode subfield, the access mode subfield to indicate an access mode of an allocation according to the grant frame; and transmit the grant frame.

Example 2 includes the subject matter of Example 1, and optionally, configured to cause the wireless station to set the access mode subfield to a predefined value to indicate that a start time of an attempt to obtain a Transmit Opportunity (TxOP) is to be determined based on a sum of a value in the allocation duration subfield and a value in the duration field.

Example 3 includes the subject matter of Example 2, and optionally, wherein the start time of the attempt to obtain the TxOP is to be determined based on the sum, and a Physical Layer (PHY) Transmit end (PHY.TXEND) indication.

Example 4 includes the subject matter of Example 2 or 3, and optionally, wherein the predefined value is "1".

Example 5 includes the subject matter of any one of Examples 1-4, and optionally, wherein the access mode subfield is in a reserved subfield of the Dynamic Allocation Info field.

Example 6 includes the subject matter of any one of Examples 1-5, and optionally, configured to cause the wireless station to transmit the grant frame as a non access point (AP) or personal basic service set (PBSS) control point (PCP) (non-AP/PCP) station (STA).

Example 7 includes the subject matter of any one of Examples 1-5, and optionally, configured to cause the wireless station to transmit the grant frame as an access point (AP) or personal basic service set (PBSS) control point (PCP) (AP/PCP) station (STA).

Example 8 includes the subject matter of any one of Examples 1-7, and optionally, configured to cause the wireless station to transmit the grant frame during a Contention-Based Access period (CBAP).

Example 9 includes the subject matter of any one of Examples 1-8, and optionally, wherein the wireless station is a Direct Multi Gigabit (DMG) station.

Example 10 includes the subject matter of any one of Examples 1-9, and optionally, comprising a transmitter to transmit the grant frame.

Example 11 includes the subject matter of any one of Examples 1-10, and optionally, comprising one or more antennas, a memory, and a processor.

Example 12 includes an apparatus comprising circuitry configured to cause a wireless station to process a received grant frame comprising a duration field and a Dynamic Allocation Info field, the Dynamic Allocation Info field comprising an allocation duration subfield and an access mode subfield, the access mode subfield to indicate an access mode of an allocation according to the grant frame; and operate according to the access mode.

Example 13 includes the subject matter of Example 12, and optionally, configured to cause the wireless station to, when the access mode subfield comprises a predefined value, determine a start time of an attempt to obtain a Transmit Opportunity (TxOP) based on a sum of a value in the allocation duration subfield and a value in the duration field.

Example 14 includes the subject matter of Example 13, and optionally, configured to cause the wireless station to determine the start time of the attempt to obtain the TxOP based on the sum, and a Physical Layer (PHY) Transmit end (PHY.TXEND) indication.

Example 15 includes the subject matter of Example 13 or 14, and optionally, wherein the predefined value is "1".

Example 16 includes the subject matter of any one of Examples 12-15, and optionally, wherein the access mode subfield is in a reserved subfield of the Dynamic Allocation Info field.

Example 17 includes the subject matter of any one of Examples 12-16, and optionally, configured to cause the wireless station to process the grant frame as a non access point (AP) or personal basic service set (PBSS) control point (PCP) (non-AP/PCP) station (STA).

Example 18 includes the subject matter of any one of Examples 12-17, and optionally, configured to cause the wireless station to process the grant frame as an access point (AP) or personal basic service set (PBSS) control point (PCP) (AP/PCP) station (STA).

Example 19 includes the subject matter of any one of Examples 12-18, and optionally, configured to cause the wireless station to process the grant frame received during a Contention-Based Access period (CBAP).

Example 20 includes the subject matter of any one of Examples 12-19, and optionally, wherein the wireless station is a Direct Multi Gigabit (DMG) station.

Example 21 includes the subject matter of any one of Examples 12-20, and optionally, comprising a receiver to receive the grant frame.

Example 22 includes the subject matter of any one of Examples 12-21, and optionally, comprising one or more antennas, a memory, and a processor.

Example 23 includes an apparatus comprising circuitry configured to cause a wireless station to generate a grant frame comprising a Source Association identification (AID) field, a Destination AID field, a duration field, and a Dynamic Allocation Info field, the Dynamic Allocation Info field comprising an allocation duration subfield, the Source AID field and the Destination AID field being set to indicate that a start time of an attempt to obtain a Transmit Opportunity (TxOP) is to be determined based on a sum of a value of the allocation duration subfield and a value of the duration field; and transmit the grant frame.

Example 24 includes the subject matter of Example 23, and optionally, wherein the Source AID field comprises a unicast AID of the wireless station, and the Destination AID field comprises a broadcast AID.

Example 25 includes the subject matter of Example 23 or 24, and optionally, wherein the start time of the attempt to obtain the TxOP is to be determined based on the sum, and a Physical Layer (PHY) Transmit end (PHY.TXEND) indication.

Example 26 includes the subject matter of any one of Examples 23-25, and optionally, configured to cause the wireless station to transmit the grant frame as a non access point (AP) or personal basic service set (PBSS) control point (PCP) (non-AP/PCP) station (STA).

Example 27 includes the subject matter of any one of Examples 23-26, and optionally, configured to cause the wireless station to transmit the grant frame as an access point (AP) or personal basic service set (PBSS) control point (PCP) (AP/PCP) station (STA).

Example 28 includes the subject matter of any one of Examples 23-27, and optionally, configured to cause the wireless station to transmit the grant frame during a Contention-Based Access period (CBAP).

Example 29 includes the subject matter of any one of Examples 23-28, and optionally, wherein the wireless station is a Direct Multi Gigabit (DMG) station.

Example 30 includes the subject matter of any one of Examples 23-29, and optionally, comprising a transmitter to transmit the grant frame.

Example 31 includes the subject matter of any one of Examples 23-30, and optionally, comprising one or more antennas, a memory, and a processor.

Example 32 includes an apparatus comprising circuitry configured to cause a wireless station to process a received grant frame comprising a Source Association identification (AID) field, a Destination AID field, a duration field, and a Dynamic Allocation Info field, the Dynamic Allocation Info field comprising an allocation duration subfield; and when the Source AID field and the Destination AID field have a predefined setting, determine a start time of an attempt to obtain a Transmit Opportunity (TxOP) based on a sum of a value of the allocation duration subfield and a value of the duration field.

Example 33 includes the subject matter of Example 32, and optionally, configured to cause the wireless station to determine the start time of the attempt to obtain the TxOP based on the sum, and a Physical Layer (PHY) Transmit end (PHY.TXEND) indication.

Example 34 includes the subject matter of Example 32 or 33, and optionally, configured to cause the wireless station to process the grant frame as a non access point (AP) or personal basic service set (PBSS) control point (PCP) (non-AP/PCP) station (STA).

Example 35 includes the subject matter of Example 32 or 33, and optionally, configured to cause the wireless station to process the grant frame as an access point (AP) or personal basic service set (PBSS) control point (PCP) (AP/PCP) station (STA).

Example 36 includes the subject matter of any one of Examples 32-35, and optionally, configured to cause the wireless station to process the grant frame received during a Contention-Based Access period (CBAP).

Example 37 includes the subject matter of any one of Examples 32-36, and optionally, wherein the wireless station is a Direct Multi Gigabit (DMG) station.

Example 38 includes the subject matter of any one of Examples 32-37, and optionally, comprising a receiver to receive the grant frame.

Example 39 includes the subject matter of any one of Examples 32-38, and optionally, comprising one or more antennas, a memory, and a processor.

Example 40 includes a method to be performed by a wireless station, the method comprising generating a grant frame comprising a duration field and a Dynamic Allocation Info field, the Dynamic Allocation Info field comprising an allocation duration subfield and an access mode subfield, the access mode subfield to indicate an access mode of an allocation according to the grant frame; and transmitting the grant frame.

Example 41 includes the subject matter of Example 40, and optionally, comprising setting the access mode subfield to a predefined value to indicate that a start time of an attempt to obtain a Transmit Opportunity (TxOP) is to be determined based on a sum of a value in the allocation duration subfield and a value in the duration field.

Example 42 includes the subject matter of Example 41, and optionally, wherein the start time of the attempt to obtain the TxOP is to be determined based on the sum, and a Physical Layer (PHY) Transmit end (PHY.TXEND) indication.

Example 43 includes the subject matter of Example 41 or 42, and optionally, wherein the predefined value is "1".

Example 44 includes the subject matter of any one of Examples 40-43, and optionally, wherein the access mode subfield is in a reserved subfield of the Dynamic Allocation Info field.

Example 45 includes the subject matter of any one of Examples 40-44, and optionally, comprising transmitting the grant frame as a non access point (AP) or personal basic service set (PBSS) control point (PCP) (non-AP/PCP) station (STA).

Example 46 includes the subject matter of any one of Examples 40-44, and optionally, comprising transmitting the grant frame as an access point (AP) or personal basic service set (PBSS) control point (PCP) (AP/PCP) station (STA).

Example 47 includes the subject matter of any one of Examples 40-46, and optionally, comprising transmitting the grant frame during a Contention-Based Access period (CBAP).

Example 48 includes the subject matter of any one of Examples 40-47, and optionally, wherein the wireless station is a Direct Multi Gigabit (DMG) station.

Example 49 includes a method to be performed by a wireless station, the method comprising processing a received grant frame comprising a duration field and a Dynamic Allocation Info field, the Dynamic Allocation Info field comprising an allocation duration subfield and an access mode subfield, the access mode subfield to indicate an access mode of an allocation according to the grant frame; and operating according to the access mode.

Example 50 includes the subject matter of Example 49, and optionally, comprising, when the access mode subfield comprises a predefined value, determining a start time of an attempt to obtain a Transmit Opportunity (TxOP) based on a sum of a value in the allocation duration subfield and a value in the duration field.

Example 51 includes the subject matter of Example 50, and optionally, comprising determining the start time of the attempt to obtain the TxOP based on the sum, and a Physical Layer (PHY) Transmit end (PHY.TXEND) indication.

Example 52 includes the subject matter of Example 50 or 51, and optionally, wherein the predefined value is "1".

Example 53 includes the subject matter of any one of Examples 49-52, and optionally, wherein the access mode subfield is in a reserved subfield of the Dynamic Allocation Info field.

Example 54 includes the subject matter of any one of Examples 49-53, and optionally, comprising processing the grant frame as a non access point (AP) or personal basic service set (PBSS) control point (PCP) (non-AP/PCP) station (STA).

Example 55 includes the subject matter of any one of Examples 49-54, and optionally, comprising processing the grant frame as an access point (AP) or personal basic service set (PBSS) control point (PCP) (AP/PCP) station (STA).

Example 56 includes the subject matter of any one of Examples 49-55, and optionally, comprising processing the grant frame received during a Contention-Based Access period (CBAP).

Example 57 includes the subject matter of any one of Examples 49-56, and optionally, wherein the wireless station is a Direct Multi Gigabit (DMG) station.

Example 58 includes a method to be performed by a wireless station, the method comprising generating a grant frame comprising a Source Association identification (AID) field, a Destination AID field, a duration field, and a Dynamic Allocation Info field, the Dynamic Allocation Info field comprising an allocation duration subfield, the Source AID field and the Destination AID field being set to indicate that a start time of an attempt to obtain a Transmit Opportunity (TxOP) is to be determined based on a sum of a value of the allocation duration subfield and a value of the duration field; and transmitting the grant frame.

Example 59 includes the subject matter of Example 58, and optionally, wherein the Source AID field comprises a unicast AID of the wireless station, and the Destination AID field comprises a broadcast AID.

Example 60 includes the subject matter of Example 58 or 59, and optionally, wherein the start time of the attempt to obtain the TxOP is to be determined based on the sum, and a Physical Layer (PHY) Transmit end (PHY.TXEND) indication.

Example 61 includes the subject matter of any one of Examples 58-60, and optionally, comprising transmitting the grant frame as a non access point (AP) or personal basic service set (PBSS) control point (PCP) (non-AP/PCP) station (STA).

Example 62 includes the subject matter of any one of Examples 58-61, and optionally, comprising transmitting the grant frame as an access point (AP) or personal basic service set (PBSS) control point (PCP) (AP/PCP) station (STA).

Example 63 includes the subject matter of any one of Examples 58-62, and optionally, comprising transmitting the grant frame during a Contention-Based Access period (CBAP).

Example 64 includes the subject matter of any one of Examples 58-63, and optionally, wherein the wireless station is a Direct Multi Gigabit (DMG) station.

Example 65 includes a method to be performed by a wireless station, the method comprising processing a received grant frame comprising a Source Association identification (AID) field, a Destination AID field, a duration field, and a Dynamic Allocation Info field, the Dynamic Allocation Info field comprising an allocation duration subfield; and when the Source AID field and the Destination AID field have a predefined setting, determining a start time of an attempt to obtain a Transmit Opportunity (TxOP) based on a sum of a value of the allocation duration subfield and a value of the duration field.

Example 66 includes the subject matter of Example 65, and optionally, comprising determining the start time of the attempt to obtain the TxOP based on the sum, and a Physical Layer (PHY) Transmit end (PHY.TXEND) indication.

Example 67 includes the subject matter of Example 65 or 66, and optionally, comprising processing the grant frame as a non access point (AP) or personal basic service set (PBSS) control point (PCP) (non-AP/PCP) station (STA).

Example 68 includes the subject matter of Example 65 or 66, and optionally, comprising processing the grant frame as an access point (AP) or personal basic service set (PBSS) control point (PCP) (AP/PCP) station (STA).

Example 69 includes the subject matter of any one of Examples 65-68, and optionally, comprising processing the grant frame received during a Contention-Based Access period (CBAP).

Example 70 includes the subject matter of any one of Examples 65-69, and optionally, wherein the wireless station is a Direct Multi Gigabit (DMG) station.

Example 71 includes a product comprising one or more tangible computer-readable non-transitory storage media comprising computer-executable instructions operable to, when executed by at least one computer processor, enable the at least one computer processor to implement one or more operations at a wireless station, the operations comprising generating a grant frame comprising a duration field and a Dynamic Allocation Info field, the Dynamic Allocation Info field comprising an allocation duration subfield and an access mode subfield, the access mode subfield to indicate an access mode of an allocation according to the grant frame; and transmitting the grant frame.

Example 72 includes the subject matter of Example 71, and optionally, wherein the operations comprise setting the access mode subfield to a predefined value to indicate that a start time of an attempt to obtain a Transmit Opportunity (TxOP) is to be determined based on a sum of a value in the allocation duration subfield and a value in the duration field.

Example 73 includes the subject matter of Example 72, and optionally, wherein the start time of the attempt to obtain the TxOP is to be determined based on the sum, and a Physical Layer (PHY) Transmit end (PHY.TXEND) indication.

Example 74 includes the subject matter of Example 72 or 73, and optionally, wherein the predefined value is "1".

Example 75 includes the subject matter of any one of Examples 71-74, and optionally, wherein the access mode subfield is in a reserved subfield of the Dynamic Allocation Info field.

Example 76 includes the subject matter of any one of Examples 71-75, and optionally, wherein the operations comprise transmitting the grant frame as a non access point (AP) or personal basic service set (PBSS) control point (PCP) (non-AP/PCP) station (STA).

Example 77 includes the subject matter of any one of Examples 71-75, and optionally, wherein the operations comprise transmitting the grant frame as an access point (AP) or personal basic service set (PBSS) control point (PCP) (AP/PCP) station (STA).

Example 78 includes the subject matter of any one of Examples 71-77, and optionally, wherein the operations comprise transmitting the grant frame during a Contention-Based Access period (CBAP).

Example 79 includes the subject matter of any one of Examples 71-78, and optionally, wherein the wireless station is a Direct Multi Gigabit (DMG) station.

Example 80 includes a product comprising one or more tangible computer-readable non-transitory storage media comprising computer-executable instructions operable to, when executed by at least one computer processor, enable the at least one computer processor to implement one or more operations at a wireless station, the operations comprising processing a received grant frame comprising a duration field and a Dynamic Allocation Info field, the Dynamic Allocation Info field comprising an allocation duration subfield and an access mode subfield, the access mode subfield to indicate an access mode of an allocation according to the grant frame; and operating according to the access mode.

Example 81 includes the subject matter of Example 80, and optionally, wherein the operations comprise, when the access mode subfield comprises a predefined value, determining a start time of an attempt to obtain a Transmit Opportunity (TxOP) based on a sum of a value in the allocation duration subfield and a value in the duration field.

Example 82 includes the subject matter of Example 81, and optionally, wherein the operations comprise determining the start time of the attempt to obtain the TxOP based on the sum, and a Physical Layer (PHY) Transmit end (PHY.TXEND) indication.

Example 83 includes the subject matter of Example 81 or 82, and optionally, wherein the predefined value is "1".

Example 84 includes the subject matter of any one of Examples 80-83, and optionally, wherein the access mode subfield is in a reserved subfield of the Dynamic Allocation Info field.

Example 85 includes the subject matter of any one of Examples 80-84, and optionally, wherein the operations comprise processing the grant frame as a non access point (AP) or personal basic service set (PBSS) control point (PCP) (non-AP/PCP) station (STA).

Example 86 includes the subject matter of any one of Examples 80-85, and optionally, wherein the operations comprise processing the grant frame as an access point (AP) or personal basic service set (PBSS) control point (PCP) (AP/PCP) station (STA).

Example 87 includes the subject matter of any one of Examples 80-86, and optionally, wherein the operations comprise processing the grant frame received during a Contention-Based Access period (CBAP).

Example 88 includes the subject matter of any one of Examples 80-87, and optionally, wherein the wireless station is a Direct Multi Gigabit (DMG) station.

Example 89 includes a product comprising one or more tangible computer-readable non-transitory storage media comprising computer-executable instructions operable to, when executed by at least one computer processor, enable the at least one computer processor to implement one or more operations at a wireless station, the operations comprising generating a grant frame comprising a Source Association identification (AID) field, a Destination AID field, a duration field and a Dynamic Allocation Info field, the Dynamic Allocation Info field comprising an allocation duration subfield, the Source AID field and the Destination AID field being set to indicate that a start time of an attempt to obtain a Transmit Opportunity (TxOP) is to be determined based on a sum of a value of the allocation duration subfield and a value of the duration field; and transmitting the grant frame.

Example 90 includes the subject matter of Example 89, and optionally, wherein the Source AID field comprises a unicast AID of the wireless station, and the Destination AID field comprises a broadcast AID.

Example 91 includes the subject matter of Example 89 or 90, and optionally, wherein the start time of the attempt to obtain the TxOP is to be determined based on the sum, and a Physical Layer (PHY) Transmit end (PHY.TXEND) indication.

Example 92 includes the subject matter of any one of Examples 89-91, and optionally, wherein the operations comprise transmitting the grant frame as a non access point (AP) or personal basic service set (PBSS) control point (PCP) (non-AP/PCP) station (STA).

Example 93 includes the subject matter of any one of Examples 89-92, and optionally, wherein the operations comprise transmitting the grant frame as an access point (AP) or personal basic service set (PBSS) control point (PCP) (AP/PCP) station (STA).

Example 94 includes the subject matter of any one of Examples 89-93, and optionally, wherein the operations comprise transmitting the grant frame during a Contention-Based Access period (CBAP).

Example 95 includes the subject matter of any one of Examples 89-94, and optionally, wherein the wireless station is a Direct Multi Gigabit (DMG) station.

Example 96 includes a product comprising one or more tangible computer-readable non-transitory storage media comprising computer-executable instructions operable to, when executed by at least one computer processor, enable the at least one computer processor to implement one or more operations at a wireless station, the operations comprising processing a received grant frame comprising a Source Association identification (AID) field, a Destination AID field, a duration field, and a Dynamic Allocation Info field, the Dynamic Allocation Info field comprising an allocation duration subfield; and when the Source AID field and the Destination AID field have a predefined setting, determining a start time of an attempt to obtain a Transmit Opportunity (TxOP) based on a sum of a value of the allocation duration subfield and a value of the duration field.

Example 97 includes the subject matter of Example 96, and optionally, wherein the operations comprise determining the start time of the attempt to obtain the TxOP based on the sum, and a Physical Layer (PHY) Transmit end (PHY.TXEND) indication.

Example 98 includes the subject matter of Example 96 or 97, and optionally, wherein the operations comprise processing the grant frame as a non access point (AP) or personal basic service set (PBSS) control point (PCP) (non-AP/PCP) station (STA).

Example 99 includes the subject matter of Example 96 or 97, and optionally, wherein the operations comprise processing the grant frame as an access point (AP) or personal basic service set (PBSS) control point (PCP) (AP/PCP) station (STA).

Example 100 includes the subject matter of any one of Examples 96-99, and optionally, wherein the operations comprise processing the grant frame received during a Contention-Based Access period (CBAP).

Example 101 includes the subject matter of any one of Examples 96-100, and optionally, wherein the wireless station is a Direct Multi Gigabit (DMG) station.

Example 102 includes an apparatus of wireless communication, the apparatus comprising means for generating at a wireless station a grant frame comprising a duration field and a Dynamic Allocation Info field, the Dynamic Allocation Info field comprising an allocation duration subfield and an access mode subfield, the access mode subfield to indicate an access mode of an allocation according to the grant frame; and means for transmitting the grant frame.

Example 103 includes the subject matter of Example 102, and optionally, comprising means for setting the access mode subfield to a predefined value to indicate that a start time of an attempt to obtain a Transmit Opportunity (TxOP) is to be determined based on a sum of a value in the allocation duration subfield and a value in the duration field.

Example 104 includes the subject matter of Example 103, and optionally, wherein the start time of the attempt to obtain the TxOP is to be determined based on the sum, and a Physical Layer (PHY) Transmit end (PHY.TXEND) indication.

Example 105 includes the subject matter of Example 103 or 104, and optionally, wherein the predefined value is "1".

Example 106 includes the subject matter of any one of Examples 102-105, and optionally, wherein the access mode subfield is in a reserved subfield of the Dynamic Allocation Info field.

Example 107 includes the subject matter of any one of Examples 102-106, and optionally, comprising means for transmitting the grant frame as a non access point (AP) or personal basic service set (PBSS) control point (PCP) (non-AP/PCP) station (STA).

Example 108 includes the subject matter of any one of Examples 102-106, and optionally, comprising means for transmitting the grant frame as an access point (AP) or personal basic service set (PBSS) control point (PCP) (AP/PCP) station (STA).

Example 109 includes the subject matter of any one of Examples 102-108, and optionally, comprising means for transmitting the grant frame during a Contention-Based Access period (CBAP).

Example 110 includes the subject matter of any one of Examples 102-109, and optionally, wherein the wireless station is a Direct Multi Gigabit (DMG) station.

Example 111 includes an apparatus of wireless communication, the apparatus comprising means for processing at a wireless station a received grant frame comprising a duration field and a Dynamic Allocation Info field, the Dynamic Allocation Info field comprising an allocation duration subfield and an access mode subfield, the access mode subfield to indicate an access mode of an allocation according to the grant frame; and means for operating according to the access mode.

Example 112 includes the subject matter of Example 111, and optionally, comprising means for, when the access mode subfield comprises a predefined value, determining a start time of an attempt to obtain a Transmit Opportunity (TxOP) based on a sum of a value in the allocation duration subfield and a value in the duration field.

Example 113 includes the subject matter of Example 112, and optionally, comprising means for determining the start time of the attempt to obtain the TxOP based on the sum, and a Physical Layer (PHY) Transmit end (PHY.TXEND) indication.

Example 114 includes the subject matter of Example 112 or 113, and optionally, wherein the predefined value is "1".

Example 115 includes the subject matter of any one of Examples 111-114, and optionally, wherein the access mode subfield is in a reserved subfield of the Dynamic Allocation Info field.

Example 116 includes the subject matter of any one of Examples 111-115, and optionally, comprising means for processing the grant frame as a non access point (AP) or personal basic service set (PBSS) control point (PCP) (non-AP/PCP) station (STA).

Example 117 includes the subject matter of any one of Examples 111-116, and optionally, comprising means for processing the grant frame as an access point (AP) or personal basic service set (PBSS) control point (PCP) (AP/PCP) station (STA).

Example 118 includes the subject matter of any one of Examples 111-117, and optionally, comprising means for processing the grant frame received during a Contention-Based Access period (CBAP).

Example 119 includes the subject matter of any one of Examples 111-118, and optionally, wherein the wireless station is a Direct Multi Gigabit (DMG) station.

Example 120 includes an apparatus of wireless communication, the apparatus comprising means for generating at a wireless station a grant frame comprising a Source Association identification (AID) field, a Destination AID field, a duration field, and a Dynamic Allocation Info field, the Dynamic Allocation Info field comprising an allocation duration subfield, the Source AID field and the Destination AID field being set to indicate that a start time of an attempt to obtain a Transmit Opportunity (TxOP) is to be determined based on a sum of a value of the allocation duration subfield and a value of the duration field; and means for transmitting the grant frame.

Example 121 includes the subject matter of Example 120, and optionally, wherein the Source AID field comprises a unicast AID of the wireless station, and the Destination AID field comprises a broadcast AID.

Example 122 includes the subject matter of Example 120 or 121, and optionally, wherein the start time of the attempt to obtain the TxOP is to be determined based on the sum, and a Physical Layer (PHY) Transmit end (PHY.TXEND) indication.

Example 123 includes the subject matter of any one of Examples 120-122, and optionally, comprising means for transmitting the grant frame as a non access point (AP) or personal basic service set (PBSS) control point (PCP) (non-AP/PCP) station (STA).

Example 124 includes the subject matter of any one of Examples 120-123, and optionally, comprising means for transmitting the grant frame as an access point (AP) or personal basic service set (PBSS) control point (PCP) (AP/PCP) station (STA).

Example 125 includes the subject matter of any one of Examples 120-124, and optionally, comprising means for transmitting the grant frame during a Contention-Based Access period (CBAP).

Example 126 includes the subject matter of any one of Examples 120-125, and optionally, wherein the wireless station is a Direct Multi Gigabit (DMG) station.

Example 127 includes an apparatus of wireless communication, the apparatus comprising means for processing at a wireless station a received grant frame comprising a Source Association identification (AID) field, a Destination AID field, a duration field, and a Dynamic Allocation Info field, the Dynamic Allocation Info field comprising an allocation duration subfield; and means for, when the Source AID field and the Destination AID field have a predefined setting, determining a start time of an attempt to obtain a Transmit Opportunity (TxOP) based on a sum of a value of the allocation duration subfield and a value of the duration field.

Example 128 includes the subject matter of Example 127, and optionally, comprising means for determining the start time of the attempt to obtain the TxOP based on the sum, and a Physical Layer (PHY) Transmit end (PHY.TXEND) indication.

Example 129 includes the subject matter of Example 127 or 128, and optionally, comprising means for processing the grant frame as a non access point (AP) or personal basic service set (PBSS) control point (PCP) (non-AP/PCP) station (STA).

Example 130 includes the subject matter of Example 127 or 128, and optionally, comprising means for processing the grant frame as an access point (AP) or personal basic service set (PBSS) control point (PCP) (AP/PCP) station (STA).

Example 131 includes the subject matter of any one of Examples 127-130, and optionally, comprising means for processing the grant frame received during a Contention-Based Access period (CBAP).

Example 132 includes the subject matter of any one of Examples 127-131, and optionally, wherein the wireless station is a Direct Multi Gigabit (DMG) station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a memory; and
   a processor configured to cause a first wireless communication station (STA) to:
   set both a value of an allocation duration field and a value of a duration field based on a time offset to be indicated to a second STA, a sum of the value of the allocation duration field and the value of the duration field to indicate the time offset from a transmit end of a grant frame; and
   transmit the grant frame to the second STA in a frequency band above 45 Gigahertz (GHz), the grant frame comprising the duration field and a dynamic allocation information (info) field, the dynamic allocation info field comprising the allocation duration field.

2. The apparatus of claim 1, wherein the time offset comprises an offset from a Physical layer (PHY) Transmit end (PHY-TXEND) indication primitive of the grant frame.

3. The apparatus of claim 1, wherein the time offset comprises an offset of an access time for a transmit attempt.

4. The apparatus of claim 1, wherein the time offset comprises an offset of an attempt to obtain a Transmit Opportunity (TxOP).

5. The apparatus of claim 1, wherein the grant frame comprises a frame control field, the duration field after the frame control field, a Receive Address (RA) field after the duration field, a Transmit Address (TA) field after the RA field, the dynamic allocation info field after the TA field, a beamforming (BF) control field after the dynamic allocation info field, and a Frame Check Sequence (FCS) field after the BF control field.

6. The apparatus of claim 5, wherein the TA field comprises a Medium Access Control (MAC) address of the first STA, and the RA field comprises a MAC address of the second STA.

7. The apparatus of claim 1, wherein the dynamic allocation info field comprises a Traffic Identifier (TID) field, an allocation type subfield after the TID field, a source Association Identifier (AID) field after the allocation type subfield, a destination AID field after the source AID field, and the allocation duration field after the destination AID field.

8. The apparatus of claim 1, wherein the first STA comprises a Directional Multi-Gigabit (DMG) STA.

9. The apparatus of claim 1 comprising a Medium Access Control (MAC), and a Physical layer (PHY).

10. The apparatus of claim 1 comprising a radio to transmit the grant frame.

11. The apparatus of claim 1 comprising one or more antennas.

12. A product comprising one or more tangible computer-readable non-transitory storage media comprising computer-executable instructions operable to, when executed by at least one processor, enable the at least one processor to cause a first wireless communication station (STA) to:
   set both a value of an allocation duration field and a value of a duration field based on a time offset to be indicated to a second STA, a sum of the value of the allocation duration field and the value of the duration field to indicate the time offset from a transmit end of a grant frame; and
   transmit the grant frame to the second STA in a frequency band above 45 Gigahertz (GHz), the grant frame comprising the duration field and a dynamic allocation information (info) field, the dynamic allocation info field comprising the allocation duration field.

13. The product of claim 12, wherein the time offset comprises an offset from a Physical layer (PHY) Transmit end (PHY-TXEND) indication primitive of the grant frame.

14. The product of claim 12, wherein the time offset comprises an offset of an access time for a transmit attempt.

15. The product of claim 12, wherein the time offset comprises an offset of an attempt to obtain a Transmit Opportunity (TxOP).

16. The product of claim 12, wherein the grant frame comprises a frame control field, the duration field after the frame control field, a Receive Address (RA) field after the duration field, a Transmit Address (TA) field after the RA field, the dynamic allocation info field after the TA field, a beamforming (BF) control field after the dynamic allocation info field, and a Frame Check Sequence (FCS) field after the BF control field.

17. The product of claim 16, wherein the TA field comprises a Medium Access Control (MAC) address of the first STA, and the RA field comprises a MAC address of the second STA.

18. The product of claim 12, wherein the dynamic allocation info field comprises a Traffic Identifier (TID) field, an allocation type subfield after the TID field, a source Association Identifier (AID) field after the allocation type subfield, a destination AID field after the source AID field, and the allocation duration field after the destination AID field.

19. The product of claim 12, wherein the first STA comprises a Directional Multi-Gigabit (DMG) STA.

20. An apparatus comprising:
   a memory; and
   a processor configured to cause a first wireless communication station (STA) to:
   receive a grant frame from a second STA in a frequency band above 45 Gigahertz (GHz), the grant frame comprising a duration field and a dynamic allocation information (info) field, the dynamic allocation info field comprising an allocation duration field;
   determine a time offset from a transmit end of the grant frame based on a sum of a value of the allocation duration field and a value of the duration field; and
   operate the first STA based on the time offset.

21. The apparatus of claim 20, wherein the time offset comprises an offset from a Physical layer (PHY) Transmit end (PHY-TXEND) indication primitive of the grant frame.

22. The apparatus of claim 20, wherein the time offset comprises an offset of an access time for a transmit attempt.

23. The apparatus of claim 20, wherein the time offset comprises an offset of an attempt to obtain a Transmit Opportunity (TxOP).

24. The apparatus of claim 20, wherein the grant frame comprises a frame control field, the duration field after the frame control field, a Receive Address (RA) field after the duration field, a Transmit Address (TA) field after the RA field, the dynamic allocation info field after the TA field, a beamforming (BF) control field after the dynamic allocation info field, and a Frame Check Sequence (FCS) field after the BF control field.

25. The apparatus of claim 24, wherein the TA field comprises a Medium Access Control (MAC) address of the second STA, and the RA field comprises a MAC address of the first STA.

26. The apparatus of claim 20, wherein the dynamic allocation info field comprises a Traffic Identifier (TID) field, an allocation type subfield after the TID field, a source Association Identifier (AID) field after the allocation type subfield, a destination AID field after the source AID field, and the allocation duration field after the destination AID field.

27. The apparatus of claim 20, wherein the first STA comprises a Directional Multi-Gigabit (DMG) STA.

28. The apparatus of claim 20 comprising a Medium Access Control (MAC), and a Physical layer (PHY).

29. The apparatus of claim 20 comprising a radio to receive the grant frame.

30. The apparatus of claim 20 comprising one or more antennas.

31. A product comprising one or more tangible computer-readable non-transitory storage media comprising computer-executable instructions operable to, when executed by at least one processor, enable the at least one processor to cause a first wireless communication station (STA) to:

receive a grant frame from a second STA in a frequency band above 45 Gigahertz (GHz), the grant frame comprising a duration field and a dynamic allocation information (info) field, the dynamic allocation info field comprising an allocation duration field;

determine a time offset from a transmit end of the grant frame based on a sum of a value of the allocation duration field and a value of the duration field; and operate the first STA based on the time offset.

32. The product of claim 31, wherein the time offset comprises an offset from a Physical layer (PHY) Transmit end (PHY-TXEND) indication primitive of the grant frame.

33. The product of claim 31, wherein the time offset comprises an offset of an access time for a transmit attempt.

34. The product of claim 31, wherein the time offset comprises an offset of an attempt to obtain a Transmit Opportunity (TxOP).

35. The product of claim 31, wherein the grant frame comprises a frame control field, the duration field after the frame control field, a Receive Address (RA) field after the duration field, a Transmit Address (TA) field after the RA field, the dynamic allocation info field after the TA field, a beamforming (BF) control field after the dynamic allocation info field, and a Frame Check Sequence (FCS) field after the BF control field.

36. The product of claim 25, wherein the TA field comprises a Medium Access Control (MAC) address of the second STA, and the RA field comprises a MAC address of the first STA.

37. The product of claim 31, wherein the dynamic allocation info field comprises a Traffic Identifier (TID) field, an allocation type subfield after the TID field, a source Association Identifier (AID) field after the allocation type subfield, a destination AID field after the source AID field, and the allocation duration field after the destination AID field.

38. The product of claim 31, wherein the first STA comprises a Directional Multi-Gigabit (DMG) STA.

* * * * *

UNITED STATES PATENT AND TRADEMARK OFFICE
CERTIFICATE OF CORRECTION

PATENT NO. : 10,182,437 B2
APPLICATION NO. : 15/602305
DATED : January 15, 2019
INVENTOR(S) : Solomon B. Trainin et al.

Page 1 of 1

It is certified that error appears in the above-identified patent and that said Letters Patent is hereby corrected as shown below:

In the Claims

In Column 36, Line 26, in Claim 36, delete "claim 25, wherein" and insert --claim 35, wherein--, therefor.

Signed and Sealed this
Fifth Day of March, 2019

Andrei Iancu
*Director of the United States Patent and Trademark Office*